(12) United States Patent
Lamothe et al.

(10) Patent No.: US 7,064,304 B2
(45) Date of Patent: Jun. 20, 2006

(54) METHOD AND INSTALLATION FOR MANUFACTURING A METALLIC COMPONENT AND COMPONENT OBTAINED BY SAID METHOD

(75) Inventors: Christian Lamothe, Floing (FR); Roger Fourile, Wadelincourt (FR); Philippe D. Nivoix, Charleville-Mezieres (FR)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/850,039

(22) Filed: May 20, 2004

(65) Prior Publication Data

US 2004/0251297 A1 Dec. 16, 2004

(30) Foreign Application Priority Data

Jun. 4, 2003 (EP) .................................. 03101625

(51) Int. Cl.
*H05B 6/10* (2006.01)
(52) U.S. Cl. .................. 219/635; 219/615; 29/890.039
(58) Field of Classification Search ................ 219/635, 219/615, 628, 617, 629, 651, 656; 29/890.039, 29/890.053, 890.054, 890.043; 228/183, 228/223, 18, 46, 200, 227, 234.1
See application file for complete search history.

(56) References Cited

U.S. PATENT DOCUMENTS

| | | | |
|---|---|---|---|
| 3,605,255 A | 9/1971 | Metzger et al. | ................ 29/494 |
| 5,295,302 A * | 3/1994 | Takai et al. | ............ 29/890.039 |
| 2001/0051323 A1 * | 12/2001 | Nishimura | .................... 432/11 |
| 2002/0023947 A1 | 2/2002 | Kimura et al. | ........... 228/262.5 |

FOREIGN PATENT DOCUMENTS

| | | |
|---|---|---|
| DE | 10032975 | 1/2002 |
| EP | 0764493 | 3/1997 |
| EP | 0931619 | 7/1999 |
| EP | 0968787 | 1/2000 |
| EP | 1018563 | 7/2000 |

* cited by examiner

*Primary Examiner*—Quang Van
(74) *Attorney, Agent, or Firm*—Patrick M. Griffin

(57) ABSTRACT

A heat exchanger is manufactured by assembling a bundle of pipes to a pair of header tanks by inserting the ends of the pipes into corresponding holes in the header tanks. The ends of the pipes include a brazing material. The assembled heater core is placed into an adapted enclosure, and heated, for example, by induction or laser heating, to a temperature above the melting temperature of the brazing material to mechanically fix the ends of the pipes to the holes. Subsequently, the heater is switched off and the heat exchanger is cooled within the enclosure.

14 Claims, 1 Drawing Sheet

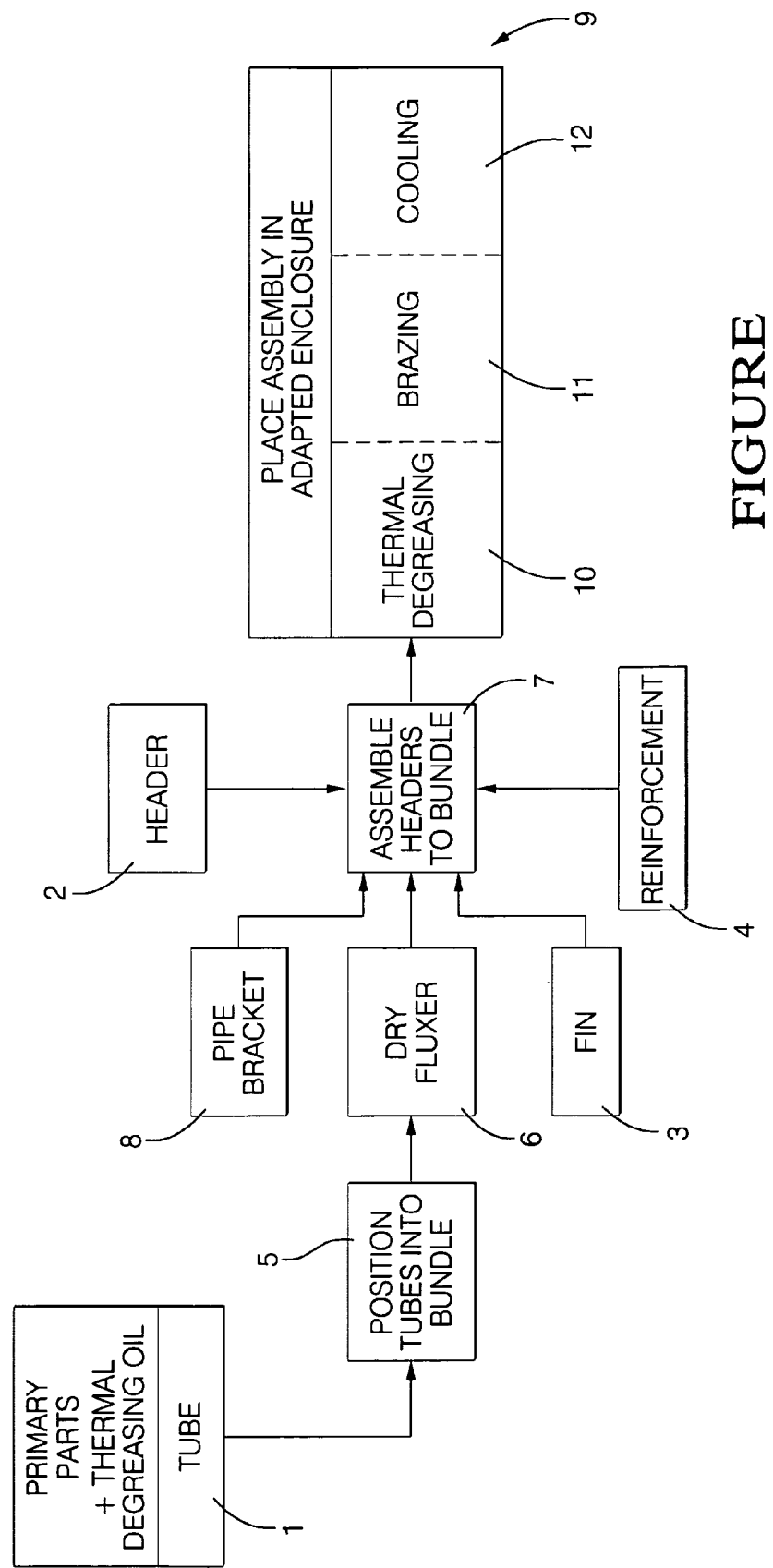
FIGURE

METHOD AND INSTALLATION FOR MANUFACTURING A METALLIC COMPONENT AND COMPONENT OBTAINED BY SAID METHOD

FIELD OF THE INVENTION

The present invention generally relates to metallic components made of a plurality of metallic parts, like e.g. heat exchangers of the type comprising a bundle of pipes each connected at both of its ends to a pair of header tanks.

The invention relates more particularly to a method for manufacturing such a metallic component, said method including separate steps of assembling different metallic parts of said component, and subsequently fixing the assembled parts by heat treatment.

BACKGROUND OF THE INVENTION

Heat exchangers typically include a pair of header tanks (an upper and a lower header tank) and a bundle of a plurality of pipes which link the pair of header tanks in fluid communication. Alternatively a plurality of fin members are attached to the pipes and disposed within the intervening spaces defined between the adjacent pipes of the bundle of pipes. These fin members may be fixed to the pipes either lengthwise or transversally. They may be corrugated. Heat exchangers of the type just described are disclosed in EP-A-0 745 821.

The heat exchangers of the type just described are normally made of a metallic material, usually steel, aluminium, copper or other metallic material according to the fluid used inside and/or outside the pipes. In the manufacture of such heat exchangers the pipes, header tanks, fin elements and other metallic pieces, if any, are usually first manufactured separately and thereafter assembled and attached to each other by a brazing method. More particularly, the pipes ends are inserted in corresponding holes of the header tanks and welded or brazed to said header tanks.

A known method for manufacturing heat exchangers in mass production includes successively a step of assembling the metallic components of the heat exchanger, a step of spraying a flux with an electrostatic flux delivering apparatus, a step of thermal degreasing in an oven to vaporize oil and grease present on the metallic elements and a step of brazing. This step of brazing comprises conveying the heat exchanger assembly on a close loop belt conveyor through a brazing furnace containing a nitrogen atmosphere.

This known method is usually used in the mass production of heat exchangers for the automotive industry (specially the car industry) and also for the home and industrial air conditioning industry.

It necessitates the use of heavy machinery having a high production output but with the disadvantage of a very limited flexibility, a very limited process ability, a long process time and an important energy consumption. This important energy consumption is particularly inherent to the use of a long oven which has a very high thermal inertia and which has thus to be maintained at high temperature during a prolonged time even when it does not contain heat exchangers assembly for a moment. The close loop belt conveyor is another source of heat loss, because this belt conveyor is first heated when passing through the oven and thereafter cooled when moved out of the oven.

Another disadvantage of this known method is the huge brazing line which is normally not less than 50 m for a height of 4 m. In the best case, starting with a heat exchanger pre-assembly, it takes more than one hour to produce a brazed heat exchanger ready for use.

This production line is further noisy, which constitutes a further disadvantage.

A still further disadvantage of this known method is its important investment cost.

SUMMARY OF THE INVENTION

Accordingly it is an object of this invention to provide an improved method for manufacturing of heat exchangers or other metallic components.

This object is solved by a method for manufacturing a metallic component comprising the steps of assembling different metallic parts of said component, and subsequently fixing the assembled parts by heat treatment. According to the invention, said heat treatment includes the steps of placing the assembled parts in an adapted enclosure, associating heater means with said assembled parts, and subsequently switching on said heating means within said enclosure in order to heat said assembled parts to a predetermined temperature at which mechanical fixing of said assembled parts occurs.

In contrast to the known manufacturing process, the present invention provides a method for manufacturing a metallic component, in which the heat treatment consists in associating a heater means to the assembled parts and transferring heat directly to the assembled parts. The heating starts only when an assembled component is present in the enclosure and can be stopped once the mechanical fixing of the different parts has occurred. Heating therefore only occurs when a pre-assembled component is actually present in the enclosure and accordingly energy consumption is considerably reduced with respect to the prior art methods. Furthermore, the heating energy being directly transferred to the pre-assembled component, heating of the metallic parts to a suitable temperature occurs considerably faster than in the prior art methods. Thus the present method increases the productivity of the manufacturing process as the time necessary for the mechanical fixing is considerably reduced.

It will be apparent to the skilled person, that the present method is applicable as well for the brazing as for the welding of the different parts. This means that the heat treatment step may be a brazing step, wherein said metallic parts are clad with a brazing material and wherein said predetermined temperature lies above a melting temperature of said brazing material. Alternatively, the heat treatment step may be a welding step, wherein said predetermined temperature lies above a melting temperature of said metallic parts.

If mechanical fixing is to be achieved by a brazing process, the method advantageously comprises the further step of applying a brazing flux material on said metallic parts prior to the step of enveloping the assembled parts in an adapted enclosure. This flux material, usually a fluxing powder, may be applied in an electrostatic process or in form of an aqueous suspension.

In a preferred embodiment of the invention, the method further comprises the step of switching off said heater means after said mechanical fixing of said assembled parts has occurred and the subsequent cooling of said metallic component within said enclosure. The cooling may e.g. be achieved by sweeping the enclosure with air at ambient temperature.

The heating step may include heating by an electrical-resistance heating process and/or an induction heating process and/or a laser heating process. These different heating techniques are easily switchable on demand and provide a fast heating of the relevant parts of the pre-assembled component.

In a preferred embodiment, the heating means is designed and controlled so that said assembled parts are heated only at selected portions thereof. The heating advantageously only occurs in those regions of the metallic parts, where mechanical fixing between different parts has to be achieved. Such selected portions comprise e.g. a boundary region between two metallic parts and/or only an outer peripheral layer of said metallic parts. The overall energy consumption can thus further be reduced by transferring energy only to those parts where heating is actually required.

The method advantageously further comprises a thermal degreasing step within said enclosure prior to heating said assembled parts to said predetermined temperature at which mechanical fixing of said assembled parts occurs. The thermal degreasing is e.g. achieved by heating selected portions of the component to a temperature, at which the grease and oil present on the parts is vaporized. This step is preferably combined with an appropriate treatment of the fumes generated within the enclosure.

The present invention also relates to an installation for manufacturing a metallic component. This installation comprises an assembly station for assembling different metallic parts of said component, and a heat treatment station for subsequently fixing the assembled parts by heat treatment. According to the invention, the heat treatment station preferably comprises an enclosure adapted for insertion of the assembled parts, and switchable heating means arranged within said enclosure, said heating means to be associated with said assembled parts for temporarily heating said assembled parts placed within said enclosure to a predetermined temperature at which mechanical fixing of said assembled parts occurs.

The heating means is preferably designed so as to heat only selected portions of said metallic parts.

The enclosure preferably comprises a hood which is placed over said assembled component. Furthermore, the enclosure advantageously comprises means associated therewith for conditioning an atmosphere inside said enclosure and means for treating gaseous pollutants generated during said heating step.

In a most preferred embodiment, said enclosure comprises a heating area and a degreasing area and/or a cooling area.

As a specific application of the above described method and installation, the present invention can be used in the process of manufacturing heat exchangers. In this embodiment, the present invention relates to a method of manufacturing a heat exchanger including separate steps of assembling and fixing by heat treatment a bundle of at least two pipes to a pair of header tanks, this method being characterized in that these steps include a positioning step which includes positioning said pipes into a bundle of pipes, an assembling step which includes assembling said header tanks respectively on both ends of said bundle of pipes and by inserting respective ends of said pipes in corresponding holes in said header tanks so as to provide an assembled heater core; and a heating step which includes placing the assembled heater core in an adapted enclosure, associating a switchable heating means with said assembled heater core, and subsequently switching on said heating means within said enclosure so as to heat at least said ends of said bundle of pipes and a portion of said header tanks which is in the vicinity of said holes to a predetermined temperature at which mechanical fixing of said assembled heater core occurs.

In the above described method, the pipes and the header tanks are made of a metallic material. This material will depend on the destination of the heat exchanger. In most cases, this material will be selected amongst steel, aluminium, copper, alloys of aluminium and alloys of copper. Other metals or metallic alloys may nevertheless be used for specific utilisation, for example titanium and titanium alloys. In case of heat exchangers for use in the car industry or in the home air conditioning industry aluminium is generally convenient.

The pipes are generally straight elongated pipes. Alternatively they may have any other profile, for example an incurved profile or an helicoidal profile. The pipes may have a circular, ovoid, polygonal or any other transversal section.

The header tanks are enlarged boxes. These boxes may be either a single chamber or divided into two or a plurality of compartments by one or a plurality of partitions. Each of the header tanks has at least one fitting for connection to a fluid circuit (for example a water circuit, an oil circuit, an air circuit or, in case of an air conditioning heat exchanger a circuit for a cooling fluid).

Both ends of each pipe of the bundle of pipes are connected respectively to both header tanks. Therefore the pipe ends are inserted in corresponding holes made through a face of the header tanks.

In a preferred embodiment, the method further comprises a cladding step wherein both ends of each pipe of the bundle of pipes are coated with a brazing material. In this context a pipe end is defined as being an end portion of a pipe, which is engaged in a corresponding hole made through a face of a header tank.

The brazing technology is well known in the art of fixing metallic parts. Brazing materials are specific alloys for use in this brazing technology and they are well known in the art. In the method according to this invention the selection of the brazing material will depend on the material of the pipes and on the material of the header tanks. The coating (or cladding) of the pipes with the brazing material may be performed by any convenient method known in the art.

In a second step of the method, the clad pipes of the first step are positioned to form a bundle of pipes. In this bundle of pipes, the pipes are generally disposed in parallel. However some of them may alternatively be obliquely disposed. The space between the pipes in the bundle of pipes is advantageously uniform.

A third step of the method is an assembling step. This step comprises connecting each pipe of the bundle of pipes to both header tanks. Therefore the pipe ends (clad with the brazing material) are inserted in corresponding holes which have been made through a face of the header tanks.

To reinforce the mechanical attachment of the pipe ends in the header tank holes, these pipe ends are advantageously flared.

Following the assembling step the pre-assembled heat-exchanger is conveyed into a heating step. In this heating step, the clad pipe ends and the portion of the header tanks, which is in the vicinity of the holes passed through by the pipes, are heated to the brazing temperature. This brazing temperature is sufficient and maintained during a time sufficient to substantially melt the brazing material of the clad pipes and attach said pipes to the header tanks firmly and in a leak-proof manner.

In the heating step the heating is substantially localized to said ends of the clad pipes and to said portion of the header tanks which is localized in the vicinity of said holes of said header tanks. It may advantageously be performed by means of an electrical resistance located inside a closed brazing chamber or an inductive heater means or by a laser heater means.

In a preferred embodiment of the method according to the invention the heating step is advantageously so arranged as to prevent any substantial heating of those portions of the pipes which are not required for the mechanical fixing of the heat exchanger. This means that the portions of the pipes, which are not to be brazed to the header tanks, are subjected to no heating or only to a heating which is insufficient to attain the melting temperature of the brazing material.

A preferred embodiment of the method of manufacturing heat exchangers comprises sweeping said brazing chamber of the heating step with a flow of an inert gas in order to eliminate substantially all the air from said brazing chamber and provide an atmosphere of inert gas in said brazing chamber. In this preferred embodiment of the invention said inert gas may be for example nitrogen, argon of helium.

In the preferred embodiment just defined, fumes are formed in the brazing chamber and extracted from said chamber. These fumes generally contain components which are detrimental for the human and animal environment and it is thus desirable to purify these fumes. For this end an alternative embodiment of this invention includes washing the fumes from said brazing chamber with a suitable solvent such a e.g. water. This washing is advantageously performed in a scrubber washing tower.

In a particular embodiment, the method includes an additional step of inserting fin members within the intervening spaces defined between the adjacent pipes of the bundle of pipes. These fin members may be disposed either lengthwise or transversally with respect to the pipes. Possibly they may be corrugated. In this embodiment, the fin members are generally made of the same metal or alloy than the pipes. In case of pipes made of aluminium, the fin members are preferably made of aluminium.

The method includes usually an additional fluxing step before said heating step. This fluxing step consists in applying a brazing flux material on the cladded pipes in order to make the brazing operation easier and more efficient. Fluxes are well known in the art. The optimum flux composition will depend on the material of the pipes and of the brazing material. It may be determined without difficulty by any person skilled in the art of welding or brazing. The flux, which usually comprises a flux powder, may be applied either electrostatically in powder form or in an aqueous suspension.

In another preferred embodiment of the method of manufacturing heat exchangers, this method includes an additional thermal degreasing step before said heating step. This degreasing step consists in removing grease and/or oil from said pipes an/or fin members and/or header tanks. This degreasing step may be performed by any means known per se. A means which is advantageous consists in vaporizing said grease an/or oil in a closed vaporizing chamber, extracting grease and/or oil vapour from said vaporizing chamber and sweeping said vaporizing chamber with a flow of air.

The heat exchanger recovered from the heating step is hot (particularly these parts thereof which have been heated to the melting temperature of the brazing material) and it is generally necessary to cool it. For this end it may currently be maintained in a flow of air at ambient temperature.

The above described method of manufacturing heat exchangers is adapted for the mass production of heat exchangers in an industrial installation of a factory.

The invention concerns thus also an installation for manufacturing a heat exchanger by means of a method as disclosed and defined hereabove. In a preferred embodiment, said installation comprises a positioning area adapted to perform positioning a series of pipes into a bundle of pipes;

an assembling area adapted to perform assembling a pair of header tanks to respectively both ends of a bundle of pipes;

a closed brazing chamber containing a heating apparatus, a source of an inert gas and a fan connected to said source of inert gas and adapted to sweep said brazing chamber with a flow of inert gas from said source of inert gas.

In the installation according to the invention, the heating may advantageously comprise an electrical-resistance heating device, an induction heating device or a laser heating device. These different heating devices may be used alone or in combination.

In a preferred embodiment, the installation of this invention includes in addition a cooling chamber, which is in communication with said brazing chamber. This cooling chamber is in communication with the surrounding atmospheric air and includes a fan adapted to force a flow of atmospheric air inside the cooling chamber.

In another preferred embodiment the installation includes a thermal degreasing chamber, which is located between said assembling area and said brazing chamber.

In a more preferred embodiment of the installation of this invention, this installation comprises a single closed enclosure, which is partitioned in three separate compartments, which are respectively the aforesaid cooling chamber, the aforesaid degreasing chamber and said brazing chamber.

In a still more preferred embodiment of the installation according to this invention the heating apparatus is surrounded by a cover or hood which is adapted to be located in the vicinity of a part of a heat exchanger assembly which has to be brazed.

The method of manufacturing and the installation disclosed above have the advantage to be low-cost and to allow a mass production of heat exchangers in a shorter time and with a higher security and an better quality than the methods and installations of the prior art. The energy consumption of the method is considerably reduced with respect to prior art processes as the pre-assembled parts are directly heated and this heating only occurs when a pre-assembled heater core is present in the heating area. Furthermore the pre-assembled component is only heated in those parts, where mechanical fixing e.g. by brazing or welding, has to occur. The installation itself is considerably smaller than the known assembly lines with brazing furnace and thus is less expensive than the installation used in the prior method and allows the use of a shorter brazing line.

The method and installation according to the invention allows the manufacture of any kind of heat exchangers, for example industrial heat exchangers for cooling liquids or gases in the chemical industry or the petrochemical industry, heat exchangers for cooling water in the electrical power stations, heat exchangers for use in the car industry and heat exchangers for the air conditioning in homes or industrial premises.

The invention relates thus also to heat exchangers manufactured by means of the method of this invention.

BRIEF DESCRIPTION OF THE DRAWINGS

FIG. 1 shows schematically an installation for the manufacturing of metallic components such as heat exchangers, using a method according to one embodiment of the invention.

DETAILED DESCRIPTION OF A PREFERRED EMBODIMENT

In the FIGURE numerals 1, 2, 3 and 4 denote respectively a series of pipes, a pair of header tanks, a series of fin members and a series of strengthening pieces.

Pipes 1 are clad pipes. This means that both ends of each pipe are coated with a brazing material.

Pipes 1, header tanks 2, fin members 3 and strengthening pieces 4 are loaded on an adequate pallet and the pallet is moved to a positioning area 5. In this area 5 the pipes are positioned to form a bundle of substantially vertical pipes.

After the positioning area 5 the pallet is moved to a flux area 6. In this flux area 6 an electrostatic gun distributes a dry flux on the bundle of clad pipes. The clad primary parts to build one core are distributed on a table or a pallet with appropriate brackets to maintain the parts with a large gap. This sub-assembly moves down one moving electrostatic gun which distributes the dry flux. The fluxer is equipped with a flux recovery system and designed to have none flux escape.

Alternatively, the flux material may be integrated directly into the clad or the primary parts may be flux painted in order to simplify the equipment.

The pallet is then moved to an assembling area 7. In this area 7 fin members 3 are produced just in time by an adequate machine and automatically inserted between the strengthening pieces and the pipes of the bundle of pipes. Alternatively brackets 8 may be attached to the fin members or pipes.

After insertion of the fin members, the bundle of pipes are squeezed to the right gap between pipes and both header tanks are pushed respectively on both ends of the pipes to form a pre-assembly of the heat exchanger. Pipe ends enter corresponding holes made through a face of the header tanks. The pipe ends are flared to have an intimate contact between said pipe ends and the corresponding holes in the header tanks.

The pallet with the heat exchanger pre-assembly is then moved towards an enclosure 9 comprising a degreasing area 10, a brazing area 11 and a cooling area 12. The heat exchanger pre-assembly first enters the degreasing area 10. In this area 10 one or several electrical inductors heat the pre-assembly to a sufficient temperature and during a sufficient time to vaporize the oil present on the pre-assembly parts. A vacuum fan extracts the fumes produced by the oil vaporization out of area 10 and drives these fumes towards a catalytic converter. Another fan harmonises the air flow around the pre-assembly and activates the oil vaporization.

After the oil vaporization the pallet with the pre-assembly enters the brazing area 11 of enclosure 9. A flow of nitrogen (or any other inert gas) is circulated through this brazing area 11 in order to sweep air away and create an inert brazing atmosphere. The pre-assembly is subjected to heating in the brazing chamber 11 in order to substantially melt the brazing material of the pipe clad ends. Further this heating is so arranged as to be essentially limited to said clad ends of the pipes and to the face of the header tanks which is passed through by said pipe ends. To attain this result and prevent a substantial heating of the other parts of the pre-assembly (notably header tanks and this portion of the pipes which is away from the pipe clad ends) this heating is advantageously performed by means of an induction means which may be combined with a laser heating means. A cover or hood adapted to the profile of the header tanks and correctly disposed in the brazing chamber 11 focuses correctly the heat from the heating means on the requisite region of the heat exchanger pre-assembly. In this heating chamber 1 the brazing material of the pipe clad ends substantially melts to provide an impervious or leak-proof anchorage of the pipes to the header tanks.

If needed, the circulation fan is kept running during the heating step until the temperature arrives just below the flux melting point. The fan is then stopped to avoid to move the clad with the consecutive surface bad aspect (orange skin). One second vacuum fan and duct system captures the fume's with potential HF at both ends of this area and forces these gas to cross a dry scrubber prior to be sent to the ambient atmosphere. The "pallet" with the core can move inside the brazing area to enlarge the time and harmonise the temperature.

The brazed heat exchanger obtained in the brazing chamber 11 is thereafter conveyed to the cooling chamber 12 of the enclosure 9. In this cooling chamber 12 the heat exchanger is cooled by a flow of air at normal ambient temperature (from substantially 15 to substantially 25° C.). The pallet with the cooled heat exchanger is then moved out of the cooling chamber 12 and of the enclosure 9 and the heat exchanger, ready for use, is discharged from the pallet.

The invention claimed is:

1. A method of manufacturing a heat exchanger including separate steps of assembling and fixing by heat treatment a bundle of at least two pipes to a pair of header tanks, wherein said pipes comprise ends clad with a brazing material, characterized in that these steps include
    a positioning step which includes positioning said pipes into a bundle of pipes,
    an assembling step which includes assembling said header tanks respectively on both ends of said bundle of pipes by inserting respective ends of said pipes in corresponding holes in said header tanks so as to provide an assembled heater core; and
    a heating step, said heating step comprising
    placing the assembled heater core in an adapted enclosure,
    thermal degreasing the assembled heater core within the enclosure to vaporize grease and/or oil,
    associating a switchable heating means with said assembled heater core,
    subsequently switching on said heating means within said enclosure so as to heat at least said ends of said bundle of pipes and a portion of said header tanks which is in the vicinity of said holes to a predetermined temperature above a melting temperature of said brazing material to mechanically fix the ends of the bundle of pipes to the holes in said header tanks, and
    subsequently switching off said heating means and cooling said pipes and header tanks within said enclosure to form the heat exchanger.

2. Method according to claim 1, further comprising the step of applying a brazing flux material on said ends of said bundle of pipes prior to the step of enveloping the assembled parts in an adapted enclosure.

3. Method according to claim 1, wherein said predetermined temperature lies above a melting temperature of said pipes and said header tanks.

4. Method according to claim 1, wherein said heating step includes heating by an electrical-resistance heating process and/or an induction heating process and/or a laser heating process.

5. Method according to claim 1, wherein said assembled heater core are heated only at selected portions thereof.

6. Method according to claim 5, wherein said selected portions comprise an outer peripheral layer of said pipes.

7. Method according to claim 1, further comprising a thermal degreasing step within said enclosure prior to heating said assembled heater core to said predetermined temperature at which mechanical fixing of said assembled heater core occurs.

8. Method according to claim 1, comprising an additional step of inserting metal fin members between said pipes, after said positioning step and before said assembling step.

9. Method according to claim 1, comprising an additional fluxing step before said heating step, said fluxing step including applying a brazing flux material on said pipes.

10. Method according to claim 1, wherein said thermal degreasing step comprises vaporizing said grease and/or oil within said enclosure, extracting grease and/or oil vapour from said enclosure and simultaneously sweeping said enclosure with a flow of air.

11. Method according to claim 1, wherein said heating step includes sweeping said enclosure with a flow of an inert gas in order to provide an atmosphere of inert gas in said enclosure.

12. Method according to claim 1, wherein said cooling step includes subjecting said assembly of pipes and header tanks to air cooling at ambient temperature.

13. Method according to claim 1, wherein the heating means is an induction heating means.

14. Method according to claim 13, wherein the heating means further comprises a laser heating means.

\* \* \* \* \*